United States Patent
Aguirre Vargas

(10) Patent No.: US 9,701,851 B2
(45) Date of Patent: Jul. 11, 2017

(54) CORE SHELL RUBBER MODIFIED SOLID EPOXY RESINS

(71) Applicant: Dow Global Technologies LLC, Midland, MI (US)

(72) Inventor: Fabio Aguirre Vargas, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/425,985

(22) PCT Filed: Oct. 13, 2013

(86) PCT No.: PCT/US2013/064745
§ 371 (c)(1),
(2) Date: Mar. 4, 2015

(87) PCT Pub. No.: WO2014/062531
PCT Pub. Date: Apr. 24, 2014

(65) Prior Publication Data
US 2015/0225576 A1   Aug. 13, 2015

Related U.S. Application Data

(60) Provisional application No. 61/714,965, filed on Oct. 17, 2012.

(51) Int. Cl.
| | | |
|---|---|---|
| B32B 27/38 | (2006.01) | |
| B32B 27/18 | (2006.01) | |
| C09D 5/03 | (2006.01) | |
| C09D 163/00 | (2006.01) | |
| C08G 59/14 | (2006.01) | |
| C08G 59/20 | (2006.01) | |
| C09D 7/12 | (2006.01) | |
| C08G 59/02 | (2006.01) | |
| C08G 59/26 | (2006.01) | |
| C08L 63/00 | (2006.01) | |

(52) U.S. Cl.
CPC ........... *C09D 7/125* (2013.01); *C08G 59/022* (2013.01); *C08G 59/1477* (2013.01); *C08G 59/26* (2013.01); *C08L 63/00* (2013.01); *C09D 5/033* (2013.01); *C09D 163/00* (2013.01); *C08G 2150/20* (2013.01); *C08L 2207/53* (2013.01); *C08L 2312/00* (2013.01); *C08L 2314/00* (2013.01)

(58) Field of Classification Search
None
See application file for complete search history.

(56) References Cited

U.S. PATENT DOCUMENTS

| | | | |
|---|---|---|---|
| 5,112,932 A * | 5/1992 | Koenig | B32B 27/04 528/51 |
| 5,206,287 A | 4/1993 | Muller et al. | |
| 6,111,015 A | 8/2000 | Eldin et al. | |
| 2008/0188626 A1 * | 8/2008 | Verghese | C08L 63/00 525/407 |
| 2009/0159313 A1 * | 6/2009 | Valette | C08G 59/30 174/250 |
| 2015/0210906 A1 * | 7/2015 | Liang | C09J 163/00 523/427 |

FOREIGN PATENT DOCUMENTS

| | | |
|---|---|---|
| EP | 0113575 A1 | 7/1984 |
| GB | 2039496 B | 8/1980 |
| JP | H11171974 A | 6/1999 |
| KR | 20030059481 A | 7/2003 |
| KR | 20040061910 A | 7/2004 |
| WO | 90/15089 A1 | 12/1990 |
| WO | 2011005420 A1 | 1/2011 |
| WO | 2011/163282 A2 | 12/2011 |
| WO | WO 2014/043048 A2 * | 3/2014 ........... C09D 163/00 |

OTHER PUBLICATIONS

PCT/US13/064745, International Search Report dated Jun. 19, 2014.
PCT/US13/064745, International Preliminary Report on Patentability dated Apr. 21, 2015.
PCT/US13/064745, Written Opinion of the International Searching Authority dated Apr. 17, 2015.

* cited by examiner

*Primary Examiner* — Michael J Feely
(74) *Attorney, Agent, or Firm* — Karl E. Stauss; Cantor Colburn LLP

(57) ABSTRACT

A polymer comprising: a) a thermosetting epoxy-terminated oxazolidinone ring containing polymer modified by b) core shell rubber particles, wherein at least 50% of the core shell rubber particles are prepared by a process comprising: I) carrying out an emulsion polymerization of monomers in an aqueous dispersion medium to form thermoplastic core shell rubber particles; II) coagulating the thermoplastic core shell rubber particles to form a slurry; and III) dewatering the slurry to form dewatered particles and IV) drying the dewatered particles to form dried particles is disclosed.

13 Claims, 1 Drawing Sheet

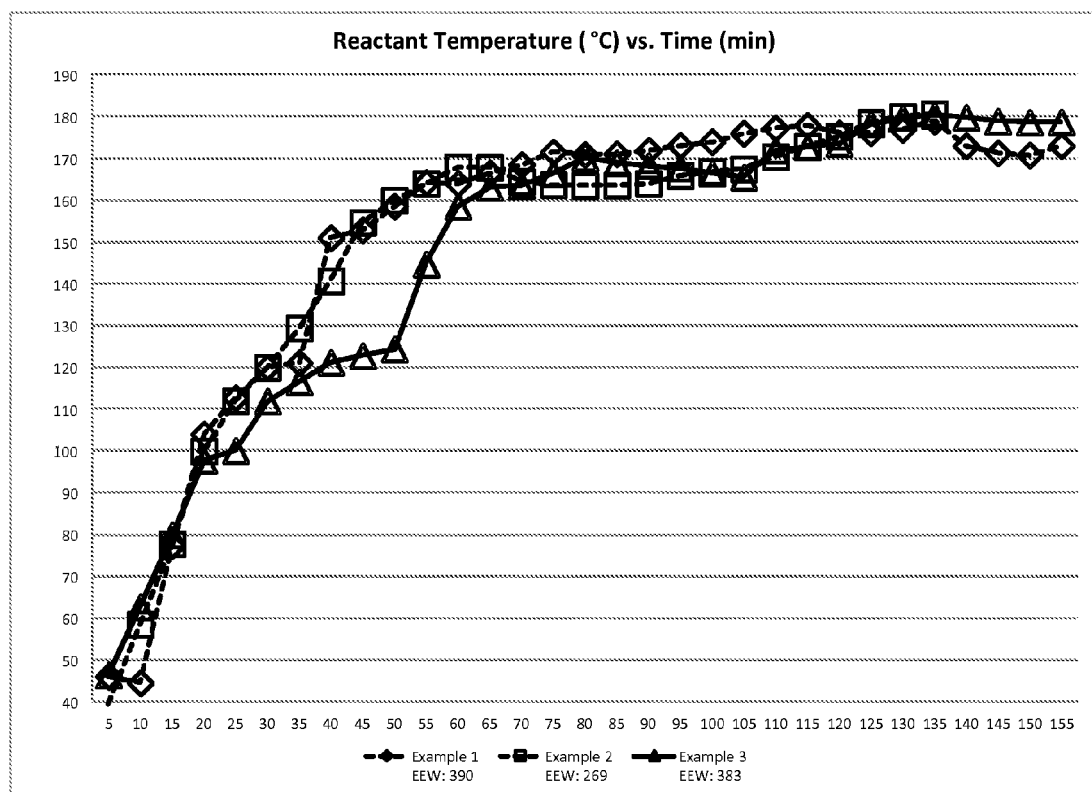

US 9,701,851 B2

CORE SHELL RUBBER MODIFIED SOLID EPOXY RESINS

BACKGROUND OF THE INVENTION

Field of the Invention

The present invention is related to isocyanate modified epoxy resins containing core shell rubber particles for fusion-bonded epoxy coating applications and to powder coating compositions which comprise these resins. The compositions may be suitable, among other things, for making corrosion protection Fusion-Bonded Epoxy (FBE) coatings or primers for pipelines through which hydrocarbons are transported from production facilities to processing facilities at high temperatures (>110° C.).

Background of the Invention

As the service temperatures of oil and gas pipelines increase due to the exploitation of ultra deep reservoirs and tar sands, the pipe coating industry has been developing high performance corrosion protection coatings and insulating multilayer systems to meet the industry needs. Currently, the pipe coating industry can provide cost-effective FBE coatings systems to meet the requirements for corrosion protection of pipelines operating at temperatures of up to about 140° C. However, it has been predicted that the next generation of high service temperature pipelines will operate at even higher temperatures. To meet this requirement, the pipe coating industry needs FBE coating or primers systems that are able to protect from corrosion pipelines operating at higher service temperatures. Further, in order to be cost competitive the FBE coating or primer systems must be applicable by using state-of-the-art FBE powder coating technology.

A key ingredient in an FBE coating composition is the Solid Epoxy Resin (SER), which determines the properties of the coating to a high extent. One strongly desirable property of an SER for use in FBE coating applications is to provide good flexibility to the coating at subzero temperatures as measured for instance by the NACE RP0394-2002 H4.3 in degrees per pipe diameter (°/PD).

Once formulated into a powder coating composition, the SER also needs to impart a good balance of physical properties to the FBE coating. One important property of the finished FBE coating is its onset glass transition temperature that should be at least 5° C. above maximum pipeline design temperature according to ISO 21809-2 Table 2—'Minimum Requirements for Coating Qualification Testing.'

However, higher glass transition temperature (Tg) does not generally lead to good flexibility; i.e. typically, the higher the Tg the lower the coating flexibility. Higher Tg is usually achieved by increasing the crosslink density of the thermoset polymer, however, this approach reduces coating flexibility. Consequently, the challenge is to break the Tg-flexibility paradigm without compromising other key coating requirements like storage stability, processability, adhesion, and corrosion resistance. In addition, the cured FBE coating must have adequate thermal aging to maintain its integrity for the lifetime of the pipeline.

Although the use of core-shell rubber particles has been known to toughen epoxy systems, it has now unexpectedly been found that by using a particular type of core shell rubber dispersed in a solid epoxy resin made from one or more polyisocyanate compounds for making an isocyanate modified epoxy resin, it is possible to produce a SER that, when incorporated into a powder coating composition, is capable of providing a tougher FBE coating that has an onset glass transition temperature of at least about 160° C. and a flexibility of at least 3°/PD and improved adhesion to the metal substrate.

SUMMARY OF THE INVENTION

In an embodiment of the present invention, there is disclosed a polymer comprising, consisting of, or consisting essentially of: a) a thermosetting epoxy-terminated oxazolidinone ring containing polymer; modified by b) core shell rubber particles, wherein at least 50% of the core shell rubber particles are prepared by a process comprising: I) carrying out an emulsion polymerization of monomers in an aqueous dispersion medium to form thermoplastic core shell rubber particles; II) coagulating the thermoplastic core shell rubber particles to form a slurry; and III) dewatering the slurry to form dewatered particles and IV) drying the dewatered particles to form dried particles.

BRIEF DESCRIPTION OF THE DRAWINGS

The FIGURE represents time versus temperature curves recorded during synthesis of the resins in Examples 1, 2, and 3.

DETAILED DESCRIPTION OF THE INVENTION

In an embodiment of the present invention, there is disclosed a polymer comprising, consisting of, or consisting essentially of: a) a thermosetting epoxy-terminated oxazolidinone ring containing polymer modified by b) core shell rubber particles, wherein at least 50% of the core shell rubber particles are prepared by a process comprising: I) carrying out an emulsion polymerization of monomers in an aqueous dispersion medium to form thermoplastic core shell rubber particles; II) coagulating the thermoplastic core shell rubber particles to form a slurry; III) dewatering the slurry to form dewatered particles and IV) drying the dewatered particles to form dried particles.

Liquid Epoxy Resin (LER)

Non-limiting examples of liquid epoxy resins which may be used to disperse the core shell rubber particles for the production of the thermosetting isocyanate modified epoxy-terminated polymers of the present invention include but are not limited to diglycidyl ethers of diols such as bisphenol A, brominated bisphenol A, bisphenol F, bisphenol K (4,4'-dihydroxybenzophenone), bisphenol S (4,4'-dihydroxyphenyl sulfone), hydroquinone, resorcinol, 1,1-cyclohexanebisphenol, ethylene glycol, propylene glycol, diethylene glycol, dipropylene glycol, butanediol, hexanediol, cyclohexanediol, 1,4-bis(hydroxymethyl)benzene, 1,3-bis(hydroxymethyl)benzene, 1,4-bis(hydroxymethyl)benzene, 1,4-bis(hydroxymethyl)cyclohexane, and 1,3-bis(hydroxymethyl)cyclohexane or cyclohexanedimethanol diglycidyl ether (CHDM-DGE); diglycidyl esters of dicarbaxylic acids such as hexahydrophthalic acid; diepoxy compounds such as cyclooctene diepoxide, divinylbenzene diepoxide, 1,7-octadiene diepoxide, 1,3-butadiene diepoxide, 1,5-hexadiene diepoxide and the diepoxide of 4-cyclohexenecarbocylate 4-cyclohexenylmethyl ester; and glycidyl ether derivatives of novolacs such as phenol novolac, cresol novolac, and bisphenol A novolac. Mixtures of two or more of these epoxy resins may be used as well. The epoxy compound may also be selected from commercially available epoxy resin products such as for example, D.E.R. 331®, D.E.R.332, D.E.R. 383, D.E.R. 354, D.E.R. 580, D.E.N. 425, D.E.N. 431, D.E.N. 438, D.E.R. 736, or D.E.R. 732, all of which are available from The Dow Chemical Company.

In an embodiment, a diglycidyl ether of a bisphenol, such as bisphenol A is used. In embodiments of the invention, at least 20%, at least 50%, at least 70%, at least 80%, or at least 90% by weight of all LERs used for the dispersion comprise diglycidyl ethers of one or more bisphenols such as bisphenol A. In an embodiment, the bisphenol (A) diglycidyl ether comprises oligomers (e.g., oligomers produced during the reaction of, e.g., bisphenol A and epichlorohydrin in the presence of alkali) in a proportion such that at least 10% in one embodiment, at least 20% in another embodiment, of all diglycidyl ether molecules comprise one or more hydroxy groups. The epoxy equivalent weight (EEW, defined herein as the average molecular weight divided by the number of epoxy groups per molecule) of the diglycidyl ether of bisphenol A may, for example, be at least 180, but will usually be not higher than 250 in an embodiment, not higher than 230 in another embodiment, or not higher than 210 in yet another embodiment. In order to reach a desirable EEW or other properties, the liquid epoxy resin (with or without Core Shell Rubber particle in dispersion) may also be combined with one or more mono, di- or multifunctional nucleophilic compounds capable of forming crosslinks between epoxy groups. These compounds can be added to the liquid epoxy resin(s) before or during the addition of the Core Shell Rubber Particles or before or during the polyisocyanate addition and/or after the polyisocyanate addition has been completed. Non-limiting examples of these nucleophilic compounds include fatty acids, dimer fatty acids, Cardanol, and Cardol.

Core Shell Rubber Particles

The dispersion also includes core shell rubber particles wherein at least 50% of the core shell rubber particles are prepared by a process comprising: I) carrying out an emulsion polymerization of monomers in an aqueous dispersion medium to form thermoplastic core shell rubber particles; II) coagulating the thermoplastic core shell rubber particles to form a slurry; III) dewatering the slurry to form dewatered particles and IV) drying the dewatered particles to form dried particles. This process is described in more detail in WO 03/016404.

The core shell rubber particles are generally produced by emulsion polymerization. The emulsion polymerization may be performed in the presence or absence of a known emulsifying agent. In an embodiment, the particles are isolated from the polymer latex formed by the emulsion polymerization process via coagulation. This is done by converting the polymer latex into a slurry by coagulation so that the polymer fine particles constituting the latex are caused to form an agglomerate thereof. The slurry is then dewatered by any suitable method known in the art, and subsequently dried by any method known in the art.

The core shell rubber comprises a polymer which may be a polymer of at least one species of monomer selected from diene monomers, aromatic vinyl monomers, (meth)acrylate ester monomers and nitrile monomers, optionally together with another copolymerizable monomer. Examples of the polymer may include but are not limited to ABS resin (acrylonitrile-butadiene-styrene resin), MBS resin (methyl methacrylate-butadiene-styrene resin), AAS resin (acrylate-acrylonitrile-styrene resin), acrylic polymer impact modifiers, and polymeric processability modifiers.

The core shell rubber particles generally have a particle size of at least 50 μm. In another embodiment, the core shell rubber particles have a particle size in the range of from 70 μm to 130 μm.

In an embodiment, examples of core shell rubber prepared by emulsion polymerization and isolated via coagulation followed by dewatering and drying for use in the present invention includes PARALOID™ EXL-3600ER, PARALOID™ EXL-2602, PARALOID™ EXL-2603, PARALOID™ EXL-2678, PARALOID™ EXL-2600ER, PARALOID™ EXL-2655, PARALOID EXL 2650a, PARALOID™ EXL-2620, PARALOID™ EXL-2691A and PARALOID™ EXL-3691A. Other core shell rubbers that can be used in combination with the preferred ones are PARALOID™ EXL-3808, PARALOID EXL™ 2300G, PARALOID™ EXL-2388, PARALOID™ EXL-2314, PARALOID™ EXL-3361, PARALOID™ EXL-2330, PARALOID™ EXL-3330, PARALOID™ EXL-2335, GRC-310, Metablen W5500, Kaneka MX-210, Kumho HR181, and combinations of any two or more thereof.

The amount of CSR dispersed in LER would be determined by targeted amount of CSR in the thermosetting epoxy-terminated oxazolidinone ring containing polymer and the need to used other LERs in combination with the LER carrying the CSR particles to balance the properties of the final thermosetting epoxy-terminated oxazolidinone ring containing polymer and/or the coating made of. For this purpose the LER:CSR weight ratio recommended is 50:50 in an embodiment, 67:33 in another embodiment and 75:25 in yet another embodiment. When the CSR is present at more than 50 weight percent, the CSR makes the dispersion viscosity too high for practical applications. At levels below 5 weight percent, there is not enough CSR present in the final thermosetting epoxy-terminated oxazolidinone ring containing polymer to produce the desire toughening effect in the coating.

In an embodiment, at least 50% of the CSR particles are prepared by emulsion polymerization and are isolated via coagulation followed by dewatering and drying, as described above. Without wishing to be bound by theory, it is believed that if more than 50% of CSR is prepared by a spray drying process (instead of by dewatering and drying), the residual a dispersant or emulsifying agent agents on the CSR can interfere with the reaction between the epoxy resin and the isocyanate.

The core shell rubber particles are generally produced by emulsion polymerization. The emulsion polymerization may be performed in the presence or absence of a known emulsifying agent. In an embodiment, a slurry is prepared with a dispersant or an emulsifying agent. Specifically, they include, for example, nonionic emulsifiers or dispersants such as alkali metal salts or ammonium salts of various acids, for example, alkyl or aryl sulfonic acids typically represented by dioctyl sulfosuccinic acid or dodecylbenzene sulfonic acid, alkyl or aryl sulfonic acid typically represented by dodecyl sulfonic acid, alkyl or aryl ether sulfonic acid, alkyl or aryl substituted phosphoric acid, alkyl or aryl ether substituted phosphoric acid, or N-alkyl or aryl sarcosinic acid typically represented by dodecyl sarcosinic acid, alkyl or aryl carboxylic acid typically represented by oleic acid or stearic acid, alkyl or aryl ether carboxylic acids, and alkyl or aryl substituted polyethylene glycol, and dispersant such as polyvinyl alcohol, alkyl substituted cellulose, polyvinyl pyrrolidone or polyacrylic acid derivative. They may be used alone or in combination of two or more.

The polymer is obtained by reacting (i) a dispersion of at least one liquid epoxy resin with said core shell rubber particles with (ii) at least one polyisocyanate compound in the presence of (iii) at least one catalyst.

Polyisocyanate

In an embodiment, the polyisocyanate starting material for the production of the thermosetting resin of the present invention comprises at least two components, i.e., MDI and polymeric MDI. The weight ratio polymeric MDI and MDI is generally at least about 05:95, e.g., at least about 55:45, or at least about 60:40, but will usually higher than about 95:05.

In an embodiment, the polymeric MDI has an average isocyanate functionality (i.e., an average number of isocyanate groups per molecule) of not higher than about 3.5, e.g., not higher than about 3, not higher than about 2.8, or not higher than about 2.7, but usually not lower than about 2.1, e.g., not lower than about 2.2, or not lower than about 2.3.

The MDI for use in making the thermosetting polymer of the present invention may be a mixture of three isomers, 2,2'-MDI, 2,4'-MDI, and 4,4'-MDI, however, the 4,4' isomer is most widely used, but any other combination of isomers are suitable as well.

In addition to the MDI and the polymeric MDI components, the isocyanate starting material for making the polymer of the present invention may comprise one or more additional isocyanate compounds. Non-limiting specific examples of such isocyanate compounds include toluene diisocyanate TDI, methane diisocyanate, butane diisocyanate (e.g., butane-1,1-diisocyanate), ethylene-1,2-diisocyanate, trans-vinylene diisocyanate, propane-1,3-diisocyanate, 2-butene-1,4-diisocyanate, 2-methylbutane-1,4-diisocyanate, hexane-1,6-diisocyanate, octane-1,8-diisocyanate, diphenylsilane diisocyanate, benzene-1,3-bis(methyleneisocyanate), benzene-1,4-bis(methyleneisocyanate), isophorone diisocyanate, cyclohexane-1,3-bis(methyleneisocyanate), 4,4'-methylene-bis(cyclohexylisocyanate) ($H_{12}$MDI), 1,3- and 1,4-bis(isocyanate) methyl cyclohexane (ADI), isomers of xylenediisocyanate, bis(4-benzeneisocyanate) ether, bis(4-benzeneisocyanate) sulfide and bis(4-benzeneisocyanate) sulfone.

In an embodiment, at least about 20%, e.g., at least about 50%, at least about 70%, at least about 80%, or at least about 90% by weight (e.g., about 100%) of the isocyanate starting materials for the preparation of the thermosetting polymers of the present invention are composed of polymeric MDI or a mixture of MDI and polymeric MDI.

In an embodiment, the liquid epoxy resin and polyisocyanate are present in the dispersion in a ratio of from 75:25 to 85:15.

The reaction of the epoxy groups and the isocyanate groups in the presence of a catalyst can result in two predominant types of ring structures, i.e., isocyanurate rings (through trimerization of isocyanate groups) and oxazolidinone rings (through reaction of an isocyanate group with an epoxy group).

The ratio of oxazolidinone rings:isocyanurate rings in the thermosetting polymer of the present invention (as can be determined by, e.g., FT-IR peak heights at 1750 and 1710 $cm^{-1}$ for oxazolidinone and the isocyanurate, respectively) will usually be at least about 95:5 (and up to about 100:0). In an embodiment, the ratio will be at least about 98:2, e.g., at least about 99:1. In other words, the average value of x in the above scheme is preferably close to 0.

The ratio of oxazolidinone rings to isocyanurate rings can be influenced by varying parameters such as, e.g., reaction temperature, amount and type of catalyst(s), relative ratio of epoxy and isocyanate compounds, and rate of addition of the isocyanate component.

Catalyst

The catalyst that is used can be any catalyst which is capable of promoting a formation of oxazolidinone rings and a branching of the polymer in the presence of the core shell rubber.

In an embodiment, the thermosetting epoxy-terminated oxazolidinone ring containing polymer is prepared with a catalyst. Non-limiting examples of suitable catalysts for the polymer formation, i.e., the formation of oxazolidinone rings (and isocyanurate rings) include nucleophilic amines and phosphines, ammonium and phosphonium salts. Specific examples thereof include nitrogen heterocycles such as, e.g., alkylated imidazoles (for example, 2-phenylimidazole, 2-methylimidazole, 1-methylimidazole, 2-methyl-4-ethylimidazole and 4,4'-methylene-bis(2-ethyl-5-methylimidazole); other heterocycles such as 1,8-diazabicyclo[5.4.0]undec-7-ene (DBU), diazabicyclooctane, hexamethylenetetramine, morpholine, piperidine; trialkylamines such as triethylamine, trimethylamine, benzyldimethylamine; phosphines such as triphenylphosphine, tritolylphosphine and triethylphosphine; quaternary ammonium and phosphonium salts such as triethylammonium chloride, tetraethylammonium chloride, tetraethylammonium acetate, tetraethyl ammonium bromide, benzyl triethyl ammonium chloride, triphenylphosphonium acetate, triphenylphosphonium iodide, ethyl triphenyl phosphonium iodide, and benzyl triphenyl phosphonium bromide. Lewis acids based on Al, Fe, Mg, or Zn such as, e.g., zinc carboxylate, organozinc chelate compounds, stannous octoate, and trialkyl aluminum compounds, and antimony containing catalysts, such as, e.g., triorganoantimony di- and tetraiodide are further non-limiting examples of catalysts that may be used for the production of the polymer of the present invention (of course, more than one catalyst may be used). The preferred catalysts are imidazole compounds. Particularly preferred catalysts are 2-phenylimidazole, 2-methylimidazole, 1-methylimidazole, 2-ethyl-4-methylimidazole, and 4,4'-methylene-bis(2-ethyl-5-methylimidazole).

The catalyst or mixture of catalysts is generally employed in an amount of from about 0.01% to about 2%, e.g., from about 0.02% to about 1% or from about 0.02% to about 0.1% by weight, based on the combined weight of the epoxy and isocyanate starting materials.

Reaction Conditions

The polymer can be prepared in any manner known to those skilled in the art. In this regard, U.S. Pat. No. 5,112, 932 and EP 0 113 575 A1, may, for example, be referred to.

The reaction is usually carried out in the absence of a solvent. The reaction temperature will usually range from about 150° C. to about 180° C. In another embodiment, the reaction is conducted at a temperature of from about 155° C. to about 175° C. In yet another embodiment, the reaction is conducted at a temperature of from about 160° C. to about 165° C.

The thermosetting polymer of the present invention generally has an equivalent epoxy weight (EEW) of at least about 320, e.g., at least about 340, at least about 360, or at least about 380, but usually not higher than about 1,000, e.g., not higher than about 500. In an embodiment, the thermosetting polymer is prepared with core shell rubbers that have been isolated from the aqueous medium via coagulation followed by dewatering and drying, rather than the ones isolated via spray drying.

While not wishing to be bound by any theory, it is speculated that during the advancement reaction between the epoxy resin and the isocyanate at elevated temperature some impurities, which are present in the core shell rubbers that are isolated via spray drying and not in those isolated from the aqueous medium via coagulation follow by dewatering and drying, act as Lewis acids blocking the amine catalyst and thus inhibiting the epoxy-isocyanate reaction. Similar effects can be observed during the advancement reaction between the epoxy resin and diphenols such as Bisphenol A and Bisphenol F.

Reaching the targeted epoxy equivalent weight (EEW) is mainly dependent on the type of core shell rubber used. For example, the desired EEW can be reached by using core shell rubbers isolated from the aqueous medium via coagulation follow by dewatering and drying. The preferred digestion temperature is in the range of from about 160° C. to about 180° C., e.g., from about 165° C. to about 175° C.

In an embodiment, the epoxy resin (with or without core shell rubber particles in dispersion) may also be combined with one or more mono. di- or multifunctional nucleophilic compounds capable of forming crosslinks between epoxy groups to achieve the desired properties (e.g., resin and coatings Tg, resin and coating viscosity, coatings flexibility and adhesion etc) of the final thermosetting epoxy-terminated oxazolidinone ring containing polymer and/or the coating made of. These compounds can be added to the epoxy resin before or during the addition of the core shell rubber particles or before or during the polyisocyanate addition and/or after the polyisocyanate addition has been completed. Non-limiting examples of these nucleophilic compounds capable of forming crosslinks between epoxy groups include fatty acids, dimer fatty acids, cardanol, cardol, alkanolamines such as 2-amino-2-hydroxymethyl-1,3-propanediol or polyhydroxy-diamine compounds such as 2,2'-((2-hydroxytrimethylene)-diimino)-bis(2-hydroxymethyl-1,3-propanediol or amine-curing agents such as, e.g., dicyandiamide and diaminodiphenylmethane, polycarboxylic acids and anhydrides such as, e.g., phthalic anhydride, tetrahydrophthalic anhydride (THPA), methyl tetrahydrophthalic anhydride (MTHPA), hexahydrophthalic anhydride (HHPA), methyl hexahydrophthalic anhydride (MHHPA), nadic methyl anhydride (NMA), succinic anhydride and maleic anhydride, and phenolic compounds such as, e.g., tris(hydroxyphenyl)ethane or -methane, polyols such as, e.g., glycerin and tris(hydroxymethyl)methane, and the like.

Other Components

Further components of the composition of the present invention may include, but are not limited to, additives selected from curing agents and curing accelerators for the crosslinking reaction between, e.g., epoxy groups and/or epoxy groups and hydroxy groups, pigments, flow control agents, adhesion promoters and fillers. Specific examples of these additives are well known to those skilled in the art.

Curing Agents

Non-limiting examples of suitable curing agents include amine-curing agents such as dicyandiamide, diaminodiphenylmethane and diaminodiphenylsulfone, polyamides, polyaminoamides, polymeric thiols, polycarboxylic acids and anhydrides such as phthalic anhydride, tetrahydrophthalic anhydride (THPA), methyl tetrahydrophthalic anhydride (MTHPA), hexahydrophthalic anhydride (HHPA), methyl hexahydrophthalic anhydride (MHHPA), nadic methyl anhydride (NMA), polyazealic polyanhydride, succinic anhydride, maleic anhydride and styrene-maleic anhydride copolymers, as well as phenolic curing agents such as phenol novolac resins.

Non-limiting examples of suitable curing accelerators include, but are not limited to, substituted or epoxy-modified imidazoles such as 2-methylimidazole, 2-phenyl imidazole and 2-ethyl-4-methyl imidazole, tertiary amines such as triethylamine, tripropylamine and tributylamine, phosphonium salts such as ethyltriphenylphosphonium chloride, ethyltriphenylphosphonium bromide and ethyltriphenylphosphonium acetate, and ammonium salts such as benzyltrimethylammonium chloride and benzyltrimethylammonium hydroxide. Curing agents and accelerators are generally used in total amounts of from about 0.5% to about 20% by weight, based on the total weight of the composition.

Powder Coating Properties

The powder coating composition of the present invention will generally comprise at least about 10%, e.g., at least about 30%, at least about 50% or at least about 60%, but usually not more than about 99%, e.g., not more than about 95%, not more than about 90% or not more than about 85% by weight of the thermosetting polymer(s) of the present invention, based on the total weight of the composition.

The powder coating composition of the present invention may be prepared by any process which blends the components of the composition substantially uniformly. For example, dry blend, semi-dry blend or melt blend procedures may be used. The blend can then be pulverized to form the powder coating composition. In an embodiment, particles of the powder coating composition will have a size of not more than about 300 microns.

The powder coating composition of the present invention can be applied to substrates by any desired powder coatings process such as, e.g., fluidized bed sintering (FBS), electrostatic powder coating (EPC) and electrostatic fluidized bed (EFB).

In the fluidized bed sintering (FBS) process a preheated substrate (e.g., a metal pipe) is immersed into the powder coating composition, which is kept suspended by a flow of air. The substrate to be coated is preheated to a temperature of, e.g., at least about 200° C., e.g., at least about 240° C., but usually not higher than to about 350° C., e.g., not higher than about 300° C., and contacted with the fluidized bed (e.g., immersed therein). The immersion time of the substrate depends, inter alia, on the desired coating thickness.

In the electrostatic powder coating (EPC) process, the powder coating composition is blown by compressed air into an applicator where it is usually charged with a voltage of about 30 to 100 kV by a high-voltage direct current, and sprayed onto preheated substrate (e.g., a metal pipe) to be coated. Then it is baked in a suitable oven. The powder adheres to the substrate due to its charge. Alternatively, the electrostatically charged powder can be sprayed onto a heated substrate such as a pipe and allowed to cure with the residual heat of the substrate or with the help of external heat.

In the electrostatic fluidized bed (EFB) process, the above procedures are combined by mounting annular or partially annular electrodes over a fluidized bed containing the powder so as to produce an electrostatic charge of, for example, 50 to 100 kV. Substrates are heated at temperatures specific for the powder coating to fully cure.

Numerous substrates can be coated with the powder coating composition of the present invention. The preferred substrates are metals (e.g., iron, steel, copper), in particular metal pipes. Examples of other materials that may be coated with the powder coating composition of the present invention include ceramic, glass fibers and composite materials. The coating made from the powder coating composition of the present invention may find use, for example, as coating material for pipelines operating at high service temperatures (e.g., 110° C. and higher).

The core-shell rubber modified and non core-shell rubber modified resins as well as the coating composition of the present invention can be also used to electrically insulate coils, transformers, and motors by coating the armatures and stators. It can also be used to coat magnet wire, bus bars, and torpid cores. Among other things, the above can be used by manufacturers of appliance fractional horsepower motors and other applications requiring UL Electrical Insulation Systems recognition. The FBE process ensures that each powder particle comprises all of the components that are necessary to obtain a complete cure and attain the stated performance properties. Properly formulated the polymers of this invention can also be used in electrical laminates and composite applications.

EXAMPLES

Materials

CSR dispersion 1: 15% of core shell acrylic polymer particles consisting of a crosslinked polybutyl acrylate core and a polymethylmethacrylate shell prepared by emulsion polymerization and isolated via spray drying (PARALOID EXL 2300G from The Dow Chemical Co.) dispersed in bisphenol A diglycidyl ether (D.E.R. 383™ from The Dow Chemical Co.)

CSR dispersion 2: 15% of core shell methacrylate butadiene styrene (MBS) polymer particles, consisting of a crosslinked polybutadiene-styrene core and a polymethacrylate-styrene shell prepared by emulsion polymerization and isolated via coagulation follow by dewatering and drying (PARALOID EXL 2650a from The Dow Chemical Co.) dispersed in bisphenol A diglycidyl ether (D.E.R. 383™ from The Dow Chemical Co.)

Methods of Measurement

In these Examples, all reactions were carried out under dry conditions with a constant dynamic purge of nitrogen. Temperatures reported below are given with an accuracy of about ±2° C. The advancement reaction between the LER and the isocyanate was carried out in a 10 lt Büchi Steel stirrer vessel with heating jacket type 3. Epoxy equivalent weight (EEW) values were obtained via EEW titration using a Mettler DL55 Auto-Titrator. Values of onset glass transition temperature, Tg, were determined according to ISO 21809-2 by Differential Scanning calorimetry (DSC) using TA Instruments DSC Q2000. The components of the powder coating mixtures were pre-ground in a high-intensity mixer for 45 seconds, compounded in a twin screw extruder, cooled and ground to a powder coating of approximately 50 micron average particle size. The powder was applied using a fluidized bed to give a thickness of 350-400 microns on 2.5 cm×0.95 cm×15.24 cm hot rolled steel bars that had been sand blasted to an anchoring profile of 60 to 100 microns. The steel bars were pre-heated to 242° C. The coating was post-cured for 3 minutes at 242° C. then the bars were immediately quenched in water until they reached ambient temperature. The bars were tested according to NACE RP0394-2002 H4.3 in degrees per pipe diameter (°/PD) for flexibility in a four-point bend apparatus commonly used in this field. The bending process was done at subzero temperatures over a 10-second period. The number of cracks that formed in the coating was counted after the bars equilibrated at ambient temperature. No cracks indicate that the coating was tougher and, hence, unlikely to fail in the field.

Example 1 (Control)

A 10 liter steel reactor was charged with 3909.4 grams of DER™ 383 at 50° C. with nitrogen pad. The temperature was increased to 120° C. and 3.0 grams of 1,8-diazabicyclo [5.4.0]undec-7-ene (DBU) (Aldrich, >98%) were added under agitation. Once the DBU was dissolved, 1200.3 grams of PAPI 94 (polymeric MDI, Dow Chemical Co., average molecular weight 325, average isocyanate functionality 2.5) was added drop wise at 165-180° C. A sample was taken 15 minutes after the addition of PAPI 94 was completed. The EEW of the solid epoxy resin sample was 390. Thereafter the reaction mixture was incubated at 180° C. for 1 hour. 15 min before draining the product from the reactor 4.85 grams of Methyl p-toluenesulfonate (MPTS) (Aldrich >98%) was added under agitation into the reactor. The final product was solid at ambient temperature and used to prepare powder coatings formulations in examples 4 and 5.

Example 2 (Control)

A 10 liter steel reactor was charged with 4.0 kg of CSR Dispersion 1 at 50° C. with nitrogen pad. The temperature was increased to 120° C. and 3.0 grams of DBU were added under agitation. 1.0 kg of PAPI 94 was added drop wise at 165-180° C. A sample was taken 15 minutes after the addition of PAPI 94 was completed. The EEW of the solid epoxy resin sample was 269. Thereafter the reaction mixture was incubated at 180° C. for 2.5 hours. The final product was a viscous liquid at ambient temperature and discarded.

Example 3

A 10 liter steel reactor was charged with 4.8 kg of CSR Dispersion 2 at 50° C. with nitrogen pad. The temperature was increased to 120° C. and 3.0 grams of DBU were added under agitation. 1.2 kg of PAPI 94 was added drop wise at 165-180° C. A sample was taken 15 minutes after the addition of PAPI 94 was completed. The EEW of the solid epoxy resin sample was 383. Thereafter the reaction mixture was incubated at 180° C. for 1.0 hour. 15 min before draining the product from the reactor 5.72 grams MPTS was added under agitation into the reactor The final product was solid at ambient temperature and was used to prepare powder coating formulation in example 5.

As illustrated in the FIGURE, the core shell rubber isolated via coagulation follow by dewatering and drying (used in CSR dispersion 2) did not affect the epoxy-isocyanate advancement reaction as the one isolated via spray drying (used in CSR dispersion 1) despite having similar reactor temperature profile.

Example 4 (Control)

A Fusion-Bonded Epoxy coating powder formulation was prepared by compounding 741.5 grams of resin from Example 1, 23.22 grams of Amicure CG 1200 (dicyandiamide powder available from Air Products), 9.34 grams of Epicure P 101 (2-methylimidazole adduct with bisphenol A epoxy resin available from Momentive), 10 grams of Modaflow Powder III (flow modifier, ethyl acrylate/2-ethylhexylacrylate copolymer in silica carrier manufactured by Cytec Surface Specialties), 215.9 grams of Vansil W20 (wollastonite filler supplied by R. T. Vanderbilt Company, Inc.) and 6.0 g of Cab-O-Sil M 5 (colloidal silica available from Cabot Corp.). The Steel bars were heated at 242° C. and immersed into the resulting powder coating then allowed to cure for 3 minutes at 242° C. and water quenched for 10 minutes. The average FBE coating thickness was about 380 microns (15 mils) The bars were bent at −30 C using the procedure recommended by NACE RP0394-2002 H4.3. The bars failed the 3.0°/PD and showed several cracks and total delamination from the metal. The resulting Fusion-Bonded Epoxy coating showed an onset glass transition temperature (Tg) of 165° C. measured by DSC according to ISO 21809-2.

Example 5

A Fusion Bonded Epoxy coating powder formulation was prepared by compounding 416.7 g of resin from Example 3, 324.5 g of resin from Example 1, 22.3 g of Amicure CG 1200, 8.7 g of Epicure P 101, 10 g of Modaflow Powder III, 217.8 g of Vansil W20 and 6 g of Cab-O-Sil M 5. The Steel bars were heated at 242° C. and immersed into the resulting powder coating then allowed to cure for 3 minutes at 242° C. and water quenched for 10 minutes. The average FBE coating thickness was about 380 microns (15 mils) The bars were bent at −30 C using the procedure recommended by NACE RP0394-2002 H4.3. The bars passed the 5.0°/PD and showed no cracks, stress marks or delamination from the metal. The resulting Fusion-Bonded Epoxy coating showed an onset Tg of 165° C. measured by DSC according to ISO 21809-2.

Table I, below shows the components of the various formulations and the EEW of each sample. The FIGURE shows time versus temperature curves recorded during the synthesis of the resins in Examples 1, 2, and 3. As it can be observed the reactants temperature was similar for during the synthesis of the resins in Examples 1, 2, and 3. However, example two did not show a significant advancement reaction.

TABLE I

Recipes and EEWs of resins in examples 1, 2 and 3.

| Components | Example 1 (grams) | Example 1 (Weight %) | Example 2 (grams) | Example 2 (Weight %) | Example 3 (grams) | Example 3 (Weight %) |
|---|---|---|---|---|---|---|
| DER ™ 383 | 3909 | 76.39 | | | | |
| CSR dispersion 1 | | | 4010.6 | 79.91 | | 79.9 |
| CSR dispersion 2 | | | | | 4818.6 | |
| PAPI 94 | 1200.3 | 23.45 | 1000.8 | 19.94 | 1202.4 | 19.9 |
| DBU | 3.07 | 0.06 | 3.0 | 0.06 | 3.61 | 0.06 |
| MPTS | 4.85 | 0.09 | 4.80 | 0.09 | 5.72 | 0.09 |
| Sample 1 (EEW) | 390 | | 269.1 | | 382.7 | |
| Sample 2 (EEW) | 391.6 | | 279.7 | | 386.7 | |
| Sample 3 (EEW) | 396.7 | | Resin Discarded | | 390.5 | |
| Sample 4 (EEW) | 403 | | Resin Discarded | | 392.6 | |
| Final EEW | 402.7 | | Resin Discarded | | 432.3 | |

What is claimed is:

1. A thermosetting powder coating composition comprising a solid thermosetting epoxy-terminated oxazolidinone ring containing polymer modified by core shell rubber particles;
   wherein the modified solid thermosetting epoxy-terminated oxazolidinone ring containing polymer is obtained by forming a reaction mixture and subjecting the reaction mixture to reaction conditions yielding a solid thermosetting epoxy-terminated oxazolidinone ring containing polymer having an epoxy equivalent weight of 340 to 1,000 and the core shell rubber particles dispersed therein;
   wherein the reaction mixture is formed by:
   providing at least one liquid epoxy resin;
   dispersing the core shell rubber particles in the at least one liquid epoxy resin to form a dispersion;
   adding at least one catalyst to the dispersion;
   adding at least one polyisocyanate compound to the dispersion, such that a weight ratio of the at least one liquid epoxy resin to the at least one polyisocyanate compound is from 75:25 to 85:15; and
   optionally adding at least one di- or multifunctional nucleophilic compound capable of forming crosslinks between epoxy groups, said optional addition is performed before or during dispersing the core shell rubber particles, before and/or after adding the at least one polyisocyanate compound, or during and/or after adding the at least one polyisocyanate compound;
   wherein at least 50% of the core shell rubber particles are prepared by a process comprising:
   I) carrying out an emulsion polymerization of monomers in an aqueous dispersion medium to form thermoplastic core shell rubber particles;
   II) coagulating the thermoplastic core shell rubber particles to form a slurry;
   III) dewatering the slurry to form dewatered particles; and
   IV) drying the dewatered particles to form dried particles; and
   wherein a cured thermosetting powder coating of the thermosetting powder coating composition has a glass transition temperature of at least 160° C., measured by differential scanning calorimetry according to ISO 21809-2.

2. The thermosetting powder coating composition of claim 1 wherein the at least one liquid epoxy resin is a diglycidyl ether.

3. The thermosetting powder coating composition of claim 1 wherein the dispersion has a core shell rubber content of at least 10 weight percent.

4. The thermosetting powder coating composition of claim 1 wherein the at least one polyisocyanate compound is selected from the group consisting of polymeric 4,4'-methylene bis(phenylisocyanate) (polymeric MDI) and 4,4'-methylene bis(phenylisocyanate) (MDI).

5. The thermosetting powder coating composition of claim 1 wherein the solid thermosetting epoxy-terminated oxazolidinone ring containing polymer has a ratio of oxazolidinone rings to isocyanurate rings of about 95:5 to about 100:0.

6. The thermosetting powder coating composition of claim 1 wherein the solid thermosetting epoxy-terminated oxazolidinone ring containing polymer has an epoxy equivalent weight of 360 to 1,000.

7. The thermosetting powder coating composition of claim 1, further comprising one or more curing catalysts.

8. A substrate having thereon a fusion-bonded epoxy coating made from the thermosetting powder coating composition of claim 1.

9. A method of making a solid thermosetting epoxy-terminated oxazolidinone ring containing polymer modified by core shell rubber particles comprising:
   forming a reaction mixture and subjecting the reaction mixture to reaction conditions yielding a solid thermosetting epoxy-terminated oxazolidinone ring containing polymer having an epoxy equivalent weight of 340 to 1,000 and the core shell rubber particles dispersed therein;

wherein forming the reaction mixture comprises:

providing at least one liquid epoxy resin;

dispersing the core shell rubber particles in the at least one liquid epoxy resin to form a dispersion;

adding at least one catalyst to the dispersion;

adding at least one polyisocyanate compound to the dispersion, such that a weight ratio of the at least one liquid epoxy resin to the at least one polyisocyanate compound is from 75:25 to 85:15; and optionally adding at least one di- or multifunctional nucleophilic compound capable of forming crosslinks between epoxy groups, said optional addition is performed before or during dispersing the core shell rubber particles, before and/or after adding the at least one polyisocyanate compound, or during and/or after adding the at least one polyisocyanate compound; and wherein at least 50% of the core shell rubber particles are prepared by a process comprising:

I) carrying out an emulsion polymerization of monomers in an aqueous dispersion medium to form thermoplastic core shell rubber particles;

II) coagulating the thermoplastic core shell rubber particles to form a slurry;

III) dewatering the slurry to form dewatered particles; and

IV) drying the dewatered particles to form dried particles.

10. The method of claim 9, wherein the at least one polyisocyanate compound is selected from the group consisting of polymeric 4,4'-methylene bis(phenylisocyanate) (polymeric MDI) and 4,4'-methylene bis(phenylisocyanate) (MDI).

11. The method of claim 9 wherein the at least one polyisocyanate compound is added to the dispersion in two or more steps.

12. The method of claim 9 wherein the reaction conditions comprise a temperature of at least about 150° C.

13. The method of claim 9 wherein the at least one liquid epoxy resin comprises bisphenol A diglycidyl ether.

* * * * *